UNITED STATES PATENT OFFICE.

CARLETON ELLIS, OF MONTCLAIR, NEW JERSEY.

PROCESS OF MAKING CATALYZERS.

1,390,685.  Specification of Letters Patent. Patented Sept. 13, 1921.

No Drawing.   Application filed April 11, 1918. Serial No. 227,889.

*To all whom it may concern:*

Be it known that I, CARLETON ELLIS, a citizen of the United States, and a resident of Montclair, in the county of Essex and State of New Jersey, have invented certain new and useful Improvements in Processes of Making Catalyzers, of which the following is a specification.

This invention relates to a process of making catalyzers and relates especially to the production of catalytic material adapted for use in the hydrogenation of the unsaturated components of fatty oils.

In carrying out my process I use as the raw material an organic salt of nickel such as nickel formate, acetate, propionate, tartrate, lactate, benzoate, etc., and subject such compound to the action of heat preferably with agitation and preferably without employing a reducing gas, heating such organic salt to a temperature preferably somewhat higher than that at which reduction normally takes place.

As an illustration of the present invention the use of nickel formate will be described. This salt when heated in the absence of an added reducing gas breaks down at a temperature somewhat above 200° C., ordinarily between 210° and 230° C. By reducing at a relatively low temperature or practically at the point where reduction begins material is obtained of which the catalytic activity is not very great, or which does not serve as the catalyst for practical operations of hydrogenating oil to the desired degree. For example in some cases a catalyzer is desired which is able to exert effective catalytic properties when properties prepared but which is not so finely divided as to be difficult of filtration. Sometimes a catalyzer is required which is rapidly settling so that when the oil is withdrawn from the hydrogenator into a settling tank the catalyzer deposits quickly and the clear oil may be drawn off and filtered with relative quickness owing to there being present little or no fine catalyzer material of a non-settling degree of fineness to clog the pores of the filter cloths. Heating to a somewhat higher temperature than the initial temperature of reduction may be employed to produce catalyzers better answering some commercial requirements. Nickel formate may be prepared by dissolving nickel hydrate in formic acid, drying carefully and grinding to a powder or the formate may be prepared from spent catalyzer by dissolving the nickel residues in formic acid. Obtained in these or in any other suitable manner the nickel formate is placed in a heating chamber such as a tank fitted with a stirrer or preferably in a drum, which is allowed to revolve while heat is applied. A temperature of 240–250° C. is reached at which temperature in the course of a half hour more or less according to conditions of working, the nickel formate will be reduced. A vent should be provided in the trunnion of the drum or elsewhere for the emission of steam and gases. On heating, the greenish color of the formate changes to a black and at the temperature mentioned, 240–250° C. a catalyzer is obtained which is of excellent activity and yet has very good settling qualities.

An advantage of catalytic material made in this manner is that it is not materially pyrophoric and in fact when properly made may be exposed to the air for a considerable period, as for example, for weighing purposes or otherwise without any serious detriment.

The requisite quantity of such catalytic material say $\frac{1}{2}$ or 1% more or less may be added to a fatty oil such as refined cottonseed oil and on introduction of hydrogen, after the oil has been raised to 180° C. or thereabouts, hydrogenation takes place, and the hydrogenated fatty product is obtained which may then be settled or filtered to remove the catalytic material. The latter may be used a second time or until exhausted in catalytic activity.

It should be noted that in the foregoing process no oil or other liquid vehicle is used during reduction, as the reduction is carried out in a dry state, or, as expressed in the claims, the process comprises "dry-heating" the raw material. In this dry-heating operation, some steam may form and escape and the term "dry" is not used herein to mean absence of steam but of a liquid vehicle serving as a suspensory fluid for the nickel material. Dry heating or dry reduction preferably is caused to take place at a temperature of at least 10° above the temperature at which actual decomposition of the formate begins, as thereby a catalyzer of somewhat coarser grain and better settling qualities with diminished pyrophoric properties is obtained.

What I claim is:

1. The process of making catalytic material adapted for use in the hardening of fatty oils which comprises dry heating an organic salt of nickel to a temperature at least ten degrees above the initial temperature of reduction.

2. The process of making catalytic material adapted for use in the hardening of fatty oils which comprises dry heating nickel formate to a temperature at least ten degrees above the initial temperature of reduction.

3. The process of making a catalyzer adapted for use in the hardening of fatty oils which comprises dry heating nickel formate in the absence of an added reducing gas to a temperature of at least 240° C.

4. The process of making a catalyzer adapted for use in the hardening of fatty oils which comprises dry heating nickel formate in the absence of an added reducing gas to a temperature substantially above the initial temperature of reduction.

CARLETON ELLIS.